(12) United States Patent
Leblanc

(10) Patent No.: US 6,837,182 B2
(45) Date of Patent: Jan. 4, 2005

(54) APPARATUS FOR CONTROLLING AQUATIC CREATURES

(76) Inventor: Hugo Leblanc, 308-5051 Clanranald, Montreal, Quebec (CA), H3X 2S3

( * ) Notice: Subject to any disclaimer, the term of this patent is extended or adjusted under 35 U.S.C. 154(b) by 0 days.

(21) Appl. No.: 10/194,525

(22) Filed: Jul. 11, 2002

(65) Prior Publication Data

US 2003/0051674 A1 Mar. 20, 2003

Related U.S. Application Data

(60) Provisional application No. 60/304,082, filed on Jul. 11, 2001.

(51) Int. Cl.$^7$ .............................................. A01K 61/00
(52) U.S. Cl. ....................................................... 119/220
(58) Field of Search .................................. 119/220, 174

(56) References Cited

U.S. PATENT DOCUMENTS

| | | | | |
|---|---|---|---|---|
| 4,211,980 A | * | 7/1980 | Stowell | 455/40 |
| 4,359,836 A | * | 11/1982 | Yuji | 43/44.9 |
| 4,593,648 A | * | 6/1986 | Marzluf | 119/220 |
| 4,667,431 A | | 5/1987 | Mendicino | |
| 4,750,451 A | * | 6/1988 | Smith | 119/220 |
| 4,825,810 A | | 5/1989 | Sharber | |
| 5,214,873 A | * | 6/1993 | Sharber | 43/17.1 |
| 5,327,854 A | * | 7/1994 | Smith et al. | 119/220 |
| 5,341,764 A | * | 8/1994 | Sharber | 119/220 |

(List continued on next page.)

OTHER PUBLICATIONS

Neiman, A.B. et al. "Stochastic synchronization of electroreceptors in the paddlefish" The Sharks Natal Board Shark-POD Diver Unit (found at www.waltan.com.au/products/sharkpod/sharkpod.html and also at users.iafrica.com/s/sh/sharkpod/).

Refere et al. Stochastic synchronization of electroreceptors in the paddlefish. Natal Sharks board of South Africa, Shark POD (found at www.sharkshield.com).

NewsChannel2000 "New Surf Board Supposed to Repel Sharks" Local Man Creates Shark–Safe Surf Board posted Aug. 16, 2001 (found at www.wesh.com/news/922291/detail.html).

Primary Examiner—Thomas Price
(74) Attorney, Agent, or Firm—Salwanchik, Lloyd & Saliwanchik

(57) ABSTRACT

The present invention provides an apparatus for controlling aquatic creatures in a body of water. The apparatus comprises a power supply, a solar conversion system, two electrodes, a controllable switch unit and a control system. In operation, this apparatus generates electromagnetic emissions that are perceivable by a number of aquatic creatures thereby providing an ability to control the behaviour of these aquatic creatures, for example, attraction or repulsion thereof. The power supply provides the necessary energy and electric voltage level for the apparatus to operate and the solar conversion system provides a means for recharging and/or maintaining a sufficient energy level within the power supply. A controllable switch unit is interconnected to the two electrodes and enables the selective application of energy provided by the power supply, thereby providing for the generation of electromagnetic emissions. The control system is integrated into the apparatus in order to provide a mechanism for controlling each of the components of the apparatus, for example, to control the generation of desired electromagnetic emissions and to control the recharging of the power supply by the solar conversion system. The apparatus according to the present invention is a self-contained system and therefore is capable of continued operation without the interconnection with other systems, for example, recharging the power supply. The present invention can be incorporated into water devices, for example surfboards, lifevests or scuba equipment.

14 Claims, 11 Drawing Sheets

U.S. PATENT DOCUMENTS

| | | | | |
|---|---|---|---|---|
| 5,460,123 A | * | 10/1995 | Kolz | 119/220 |
| 5,540,845 A | * | 7/1996 | Blanchard et al. | 210/709 |
| 5,551,377 A | * | 9/1996 | Sharber | 119/220 |
| 5,566,643 A | * | 10/1996 | Charter et al. | 119/220 |
| 5,817,142 A | * | 10/1998 | Corder | 607/76 |
| 5,850,806 A | * | 12/1998 | Mark et al. | 119/219 |
| 6,029,388 A | * | 2/2000 | Yokogawa et al. | 43/17.6 |
| 6,031,249 A | * | 2/2000 | Yamazaki et al. | 257/66 |
| 6,134,824 A | * | 10/2000 | Gleeson | 43/17.1 |
| 6,508,929 B1 | * | 1/2003 | Mercer | 205/701 |

* cited by examiner

APPARATUS FOR CONTROLLING AQUATIC CREATURES

CROSS-REFERENCE TO RELATED APPLICATION

This application claims the benefit of provisional patent application Serial No. 60/304,082, filed Jul. 11, 2001, which is hereby incorporated by reference in its entirety, including all figures, tables, and drawings.

FIELD OF THE INVENTION

The present invention pertains to an apparatus that can be used for controlling aquatic creatures.

BACKGROUND

Various aquatic creature repellant devices, particularly shark, have been proposed over the years. A large number of these devices appear to rely on the electro-perception of sharks which is performed by the ampullae of Lorenzini in the shark's nose and head. These sensory organs have been shown, for instance, by Dr. Adrianus J. Kalmijn, to be extremely sensitive to electrical fields in sea water. Using fields decreasing to 5 nVcm-1 at distances 24 cm to 30 cm from the field source, Kalmijn was able to stimulate feeding attacks in response to electric fields simulating prey. It should be appreciated that this research was conducted against the background that the human body, especially when the skin is damaged, creates substantially stronger bioelectric fields, which some sharks in the ocean can detect from distances up to at least 1 m. The galvanic fields of metallic objects are usually even stronger, which, according to Kalmijn, would explain much of the aberrant behavious of sharks in the presence of man and underwater gear.

Therefore, shark repulsion maybe achieved by overstressing their natural electro-sensors. The so-called ampullary receptors in sharks' physiology may allow them to sense electromagnetic radiations of preys' heartbeats, for example. Bandwidth of those sensors is within the Extremely Low Frequency range (<300 Hz) of the electromagnetic spectrum.

U.S. Pat. No. 5,566,643 defines a method and apparatus for controlling aquatic animals, particularly sharks, wherein electrodes are immersed in a body of water and an electric field is created between the electrodes by applying electrical pulses thereto. This patent elaborates about generating a current in salted water, whereas literature makes it clear that ampullary receptors are sensitive to electric fields rather than current flow. This U.S. patent utilizes, among other things, electrodes that are in direct contact with sea water (their device was tested with 1 ohm shunt resistance across electrodes to simulate sea water conditions), which imposes to implement current limiting in the circuitry to minimize current consumption. The apparatus is immersed in water with direct electrical contact with the radiating electrodes. In addition, a current sensor must be used to limit the current, otherwise the supply source would be depleted quickly. Two immersed electrodes with a given voltage gradient, generate a current flow that is a direct path between the electrodes. This occurs because the resistance of the water is of very low impedance and that current seeks for least resistance, hence this is direct path. In addition, U.S. Pat. No. 5,566,643 discloses the use of a fixed pulse frequency, therefore the pulse frequency does not change over time.

The effect of repulsion is actually achieved by creating a pulsed electric field where the pattern meets a shark's receptors bandwidth and respects ionic properties of salted water. Literature suggests that the ampullary receptors have high sensitivity and respond to low frequencies in the 0.1–20 Hz range. As for the ions in salt water, it is disclosed in U.S. Pat. No. 4,211,980 that when an electrical field is created by two electrodes with a voltage gradient, the transient state consists of ions moving towards their respective opposite electrode (positive ions go to cathode and negative ions go to anode). When the system reaches a steady state, all ions stop moving. At this point, there is a barrier that inhibits the initial electric field magnitude. If this state is reached, a voltage gradient between electrodes is not effective.

With further reference to U.S. Pat. Nos. 5,566,643 and 4,211,980, these specifications have limited system considerations such as energy budgeting. In particular, they propose descriptions of transducers without considering the systems in their integrity. The power supply is a black box component and no strategy is proposed to make the apparatus well integrated in an application and convenient to use. In addition, power supply electronics are not described and so critical parameters such as supply autonomy are not addressed. In particular, issues such as how to recharge on-board local source of energy are also not addressed, which, in general, would be very important for the apparatus to sustain operation for long periods of time.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide an apparatus for controlling aquatic creatures. In accordance with an aspect of the present invention, there is provided an apparatus for controlling aquatic creatures in a body of water, said apparatus comprising: a power supply; a solar conversion means electrically connected to the power supply, for maintaining a desired level of energy within the power supply; a first electrode and a second electrode; a controllable switch means for connecting the first and second electrodes selectively to an output of the power supply; and a control means for providing control signals to the solar conversion means and the controllable switch means, thereby controlling the conversion of solar energy into a form compatible with the power supply and additionally controlling the application of electrical energy to the first and second electrodes by the controllable switch means; wherein the apparatus is in operational contact with the body of water.

DETAILED DESCRIPTION OF THE INVENTION

The present invention provides an apparatus for controlling aquatic creatures in a body of water. The apparatus comprises a power supply, a solar conversion system, two electrodes, a controllable switch unit and a control system. In operation, this apparatus generates electromagnetic emissions that are perceivable by a number of aquatic creatures thereby providing an ability to control the behaviour of these aquatic creatures, for example, attraction or repulsion thereof. The power supply provides the necessary energy and electric voltage level for the apparatus to operate and the solar conversion system provides a means for recharging and/or maintaining a sufficient energy level within the power supply. A controllable switch unit is interconnected to the two electrodes and enables the selective application of energy provided by the power supply, thereby enabling the generation of electromagnetic emissions. The control system is integrated into the apparatus in order to provide a mechanism for controlling each of the components of the apparatus, for example, to control the generation of the desired electromagnetic emissions and to control the recharging of the power supply by the solar conversion system. The apparatus according to the present invention is a self-contained system and therefore is capable of continued operation without the interconnection with other systems, for example, recharging the power supply.

Figure 1:
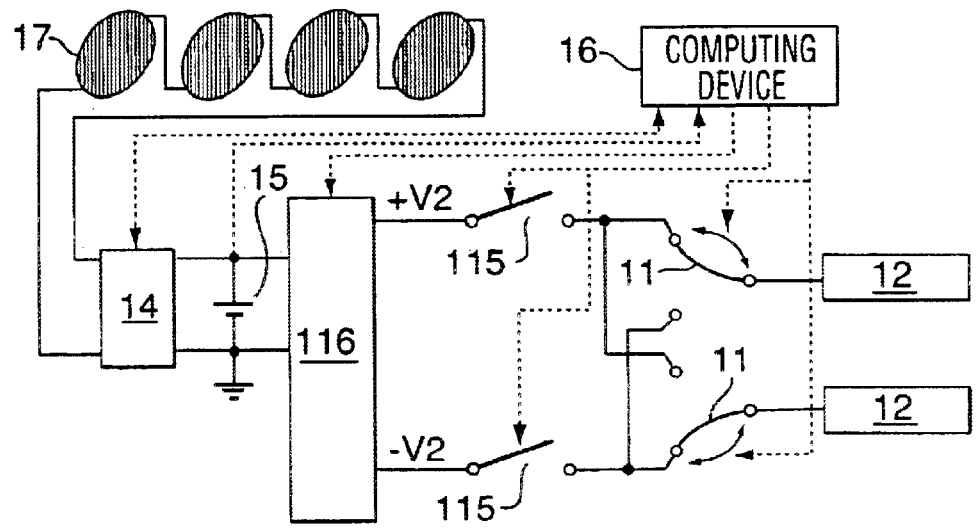
FIG. 1 illustrates a synoptic architecture of the apparatus according to one embodiment of the present invention.
Figure 2:
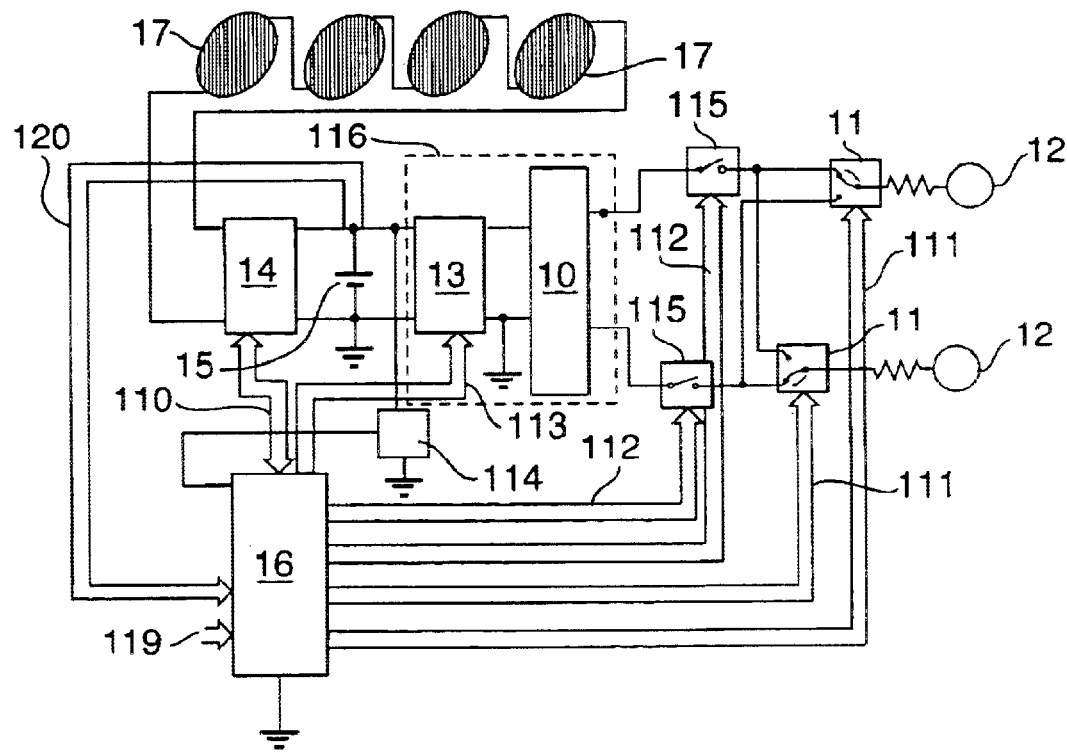
FIG. 2 illustrates a circuit architecture of the apparatus for the embodiment illustrated in FIG. 1.

In one embodiment of the invention the synoptic and circuit architecture of the apparatus are illustrated in FIGS. 1 and 2, respectively. The apparatus comprises at least one solar panel 17 for the collection of solar energy, wherein this solar panel 17 is interconnected to a solar converter 14 which transforms the output from the solar panel 17 to a form compatible with the local energy source 15. The local energy source 15 is interconnected to both the computing device 16 and a transmitter converter 116, thereby providing energy to each of these components. The transmitter converter 116 provides a means for the creation of a differential output voltage, for example +V2, −V2, which is connected to a set of pulse switches 115. The pulse switches 115 control the application of energy to the electrodes 12. Additionally the apparatus comprises a set of polarity switches 11, between the pulse switches 115 and the electrodes. These polarity switches 11 provide a means for adjusting the polarity of the energy being transmitted to the electrodes 12, for example, positive or negative. The computing device 16, draws energy from the local energy source 15 and provides control signals and reads indicator signals to and/or from the solar converter 14, the transmitter converter 116, the pulse switches 115, the polarity switches 11, the local energy source 15 and the external ON/OFF control (not shown), wherein these control/indicator signals are numbered 110, 113, 112 111, 120, and 119, respectively, in FIG. 2.

Power Supply

The power supply supplies the energy required to operate the system, including the operation of the components and the generation of the electromagnetic pulses by the apparatus.

In one embodiment of the present invention, the power supply comprises a local energy source and a transmitter converter. The local energy source may be in the form of a battery, wherein this battery may take a number of different forms and may be rechargeable, for example lithium, nickel cadmium, polymer or any other type of battery as would be known to a worker skilled in the art. There may optionally be a number of batteries forming the local energy source, for example, 2, 3 or 4 batteries. The power supply further comprises a transmitter converter which provides a means for the creation of a differential output voltage, for example +V and −V, for subsequent delivery to the pulse switches.

In one embodiment of the invention, the selection of the size or voltage capacity of the battery may depend the application of the apparatus and/or the device into which the apparatus is being integrated. For example, the smaller the device, the more compact and lighter the apparatus must be and therefore, the battery must equally be small and light. A worker skilled in the art would understand how to select an appropriate battery type for the apparatus depending on the device into which the apparatus is being integrated.

In one embodiment of the present invention, the local energy source may optionally have an alternate recharging mechanism. For example, the power supply may incorporate a recharging mechanism that can be plugged into an alternating current source, for example a standard plug in a wall. A worker skilled in the art would understand how to design the circuitry such that this type of charging method can be used with the apparatus of the present invention.

Solar Conversion Means

The solar conversion means comprises at least one solar panel and a solar converter. The solar panel receives solar radiation and converts it into another form and the solar converter transforms the energy into a format that is compatible with the power supply of the apparatus. In this manner the local energy source may be continuously or periodically recharged thereby possibly not requiring the interconnection to an external power source for recharging of the local energy source.

The solar panels are solar panellized wafers and the surface area thereof can be based on the desired recharging capabilities of the solar conversion system. A worker skilled in the art would understand how to determine an adequate surface area for the solar panels in order to supply the desired effect. In one embodiment of the invention a number of solar panels are integrated into the apparatus and these panels are connected in series thereby potentially maximizing the input energy therefrom into the solar converter.

In one embodiment of the present invention, the solar converter is a DC-to-DC converter which steps up the energy level supplied by the solar panels to a level which is compatible with the local energy source and thereby can enable the recharging of the local energy source. In one embodiment, the solar converter is two sets of two DC-to-DC converters that are connected in a parallel arrangement. A worker skilled in the art would understand a number of different designs for the solar converter which would provide the desired effect of recharging and/or maintaining a desired energy level within the local energy source.

Electrodes

There are at least two electrodes incorporated into the apparatus which radiate the electromagnetic energy therefrom. There are a number of types of electrodes which can integrated into the apparatus of the present invention as would be known to worker skilled in the art, for example a conductive metal.

Controllable Switch Means

The present invention comprises as least one controllable switch means which provides for the creation of an electromagnetic pulse, wherein the activation of a pair of controllable switches transfers energy from the power supply to each of the electrodes. Through the control provided by the control means the activation of this controllable switch means provides for the control of the pulse duration. The period of the pulses can also be adjusted using these controllable switch means. In one embodiment of the invention, an appropriate controllable switch means for this purpose is a single-pole-single-throw (SPST) complementary-metal-oxide-semiconductor-field-effect-transistor (CMOS) switch. A number of other types of switches may be used as this controllable switch means, provided they have compatible capabilities as previously mentioned. A worker skilled in the art would understand other types of switches that would be compatible with the apparatus according to the present invention.

In one embodiment of the present invention, there is a second controllable switch means, which provides for a means for alternating the polarity of the energy being passed to the electrodes. In this manner, the polarity of the electrodes can be changed without the need for adjusting the energy being supplied by the power supply. In one embodiment of the invention, the second controllable means is a single-pole-double-throw (SPDT) complementary-metal-oxide-semiconductor-field-effect-transistor switch. A number of other types of switches may be used as this controllable switch means, provided they have compatible capabilities as previously mentioned. A worker skilled in the art would understand other types of switches that would be compatible with the apparatus according to the present invention.

Control Means

The control means provides the control signals to the components comprising the solar conversion means and the controllable switch means, thereby controlling the conversion of solar energy into a form compatible with the power supply and additionally controlling the application of electrical energy to the electrodes by the controllable switches.

In one embodiment of the invention, the control means further provides control signals to a further controllable switch means, thereby controlling the polarity of the energy being applied to the electrodes.

The control means can be any form of device that is capable of performing a number of functions, for example a micro-controller with a 4-bit or 8-bit data bus, a computing device, or any type of device which provides the desired functionality. A worker skilled in the art would understand which type of computing means would be appropriate for use with the apparatus according to the present invention. The determination of an appropriate control means may be based on for example, computational speed, weight, power consumption, durability, or any other factor as would be known to a worker skilled in the art.

In one embodiment of the present invention, the control means incorporates an activation and/or deactivation switch thereby enabling the discontinuation of the transmission of electromagnetic pulses by the apparatus.

In one embodiment of the present invention, additional sensors are provided, for example to determine the energy level within the local energy source and/or to detect the presence of solar energy. These types of sensors may provide a means for the control means to determine a mode of operation of the apparatus. A worker skilled in the art would understand how to integrate these types of sensors into the apparatus.

In one embodiment of the invention, the control means enables a number of operational modes of the apparatus. For example, Normal, Charge, Battery Only and Storage mode. For example, Normal mode may represent the mode of operation of the apparatus where electromagnetic emissions are being generated and solar energy is available; Charge mode may represent the state where electromagnetic emissions are not being generated and solar energy is available; Battery Only mode may represent a state where electromagnetic emissions are being generated and solar energy is not available; and Storage mode may represent a state where electromagnetic emissions are not being generated and solar energy is not available. Other modes of operation may be available as would be known to a worker skilled in the art. In addition, a worker skilled in the art would also understand how to design the control means in order to enable transfer between these various modes of operation.

In one embodiment of the present invention, the apparatus further comprises an electric field detection means, which can provide for the detection and measuring of the electromagnetic field generated by the apparatus. The electric field detection means comprises an electric field detector and a comparator detector thereby enabling the evaluation of the field generated. In this manner during operation of the apparatus, a user may be able to determine if the apparatus is operating in the desired manner. The control means associated with the apparatus can provide control signals to the electric field detection means thereby controlling the functionality of this system.

In one embodiment of the present invention, the apparatus can be integrated into a number of different devices. For example, the apparatus can be integrated into a surfboard, a life vest, surf ski, buoy, a warf, scuba equipment (wet or dry suits, for example) or any other type of device, such as one located at a seal pup nursary, as would be known to a worker skilled in the art, wherein the device is used in a body of water and the control of aquatic creatures is desired. In this manner, for example and with reference of FIG. 3, a surfer having a surfboard with an integrated apparatus according to the present invention, may be protected against attack by aquatic creatures like sharks. Based on the self contained design of the apparatus and the integral recharging system incorporated therein, the local energy source may be recharged, for example, during the use of the surfboard. In this manner the local energy source may not have to be recharged during a period of time of non-use of the surfboard.

Figure 3:
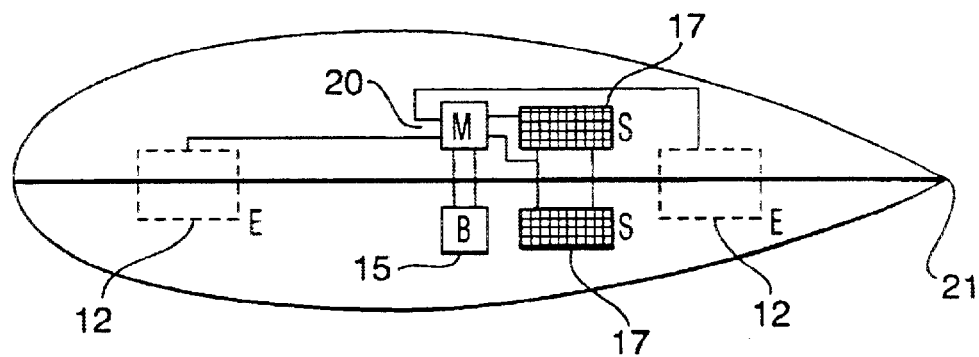
FIG. 3 illustrates the apparatus according to one embodiment of the present invention integrated into a surfing board.

With further reference to FIG. 3, one potential placement of the various components of the apparatus is illustrated using an example of a surfboard. The electrodes 12 may be positioned at the head and tail of the board. The module 20 which is the electronics module which provides the functionality of the apparatus and the power supply 15, may both be placed in the central portion of the board, potentially for added protection of these components and to achieve improved weight repartition. The solar panels 17 for the collection of solar radiation must be strategically placed such that their ability to collect the solar radiation is not impeded by the user of the surfboard, for example, being covered by the user's feet. The integration of the apparatus according to the present invention, into a surfboard can be provided in a manner such that it does not affect the performance of the surfboard during use, while providing the generation of a desired level of electromagnetic radiation. For example, the apparatus can be integrated in such a manner that the speed of manufacture of the board is not affected greatly. In addition, the integration of the apparatus may not affect the physical properties of the board, for example the weight and hydrodynamic shape of the board.

In another embodiment, the integration of the apparatus into a buoy may provide a means for protecting a swimming location from the entrance of unwanted aquatic creatures. In this manner the buoys having the integrated apparatus may be positioned such that they surround the swimming area and therefore provide for the repulsion of sharks, for example. A worker skilled in the art would understand how to integrate the apparatus into a buoy in a manner that each of the components of the apparatus would function in the intended fashion. For example, the proper placement of the solar panels for the collection of solar radiation.

As would be known to a worker skilled in the art, the apparatus of the present invention could be integrated into a number of different devices. In addition, the integration of the apparatus may be performed during or after the fabrication of a particular device. A worker skilled in the art would also understand how to position each of the elements of the apparatus in order to provide for example, protection for the components, functionality of the components of the apparatus and to minimize disruption or inconvenience during the use of the device into which the apparatus is integrated.

EXAMPLE

One embodiment of the present invention will be described in detail with reference to FIGS. 4 to 14 and Tables 1 to 4.

Overview

Figure 4:
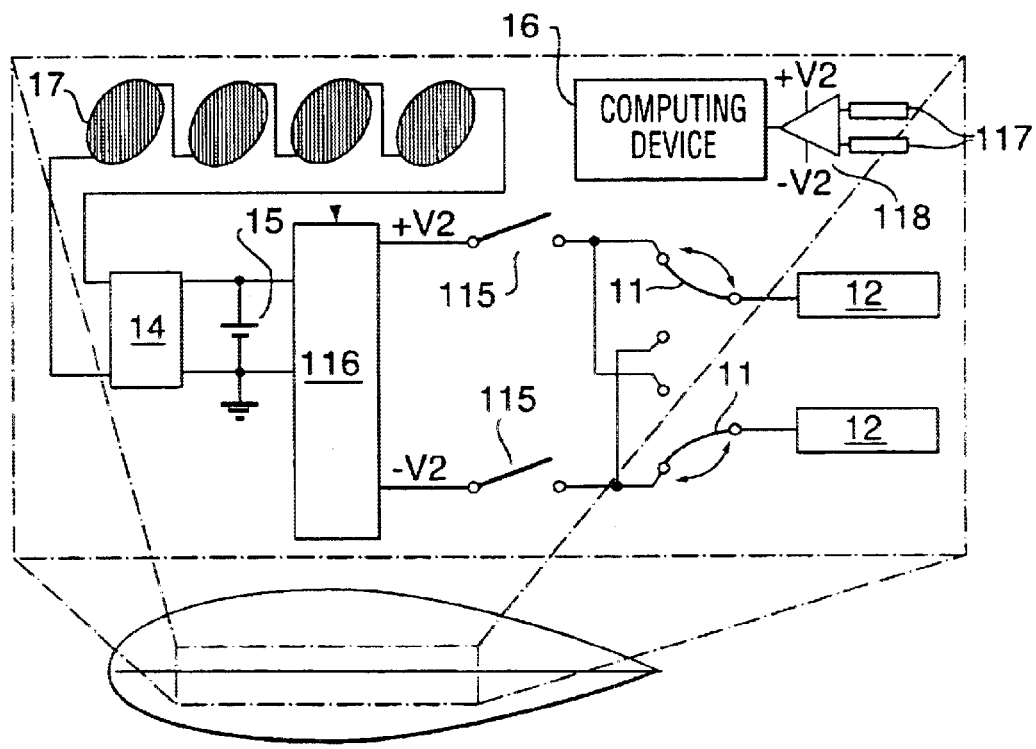
FIG. 4 illustrates a synoptic architecture of the apparatus according to another embodiment of the present invention.
Figure 5:
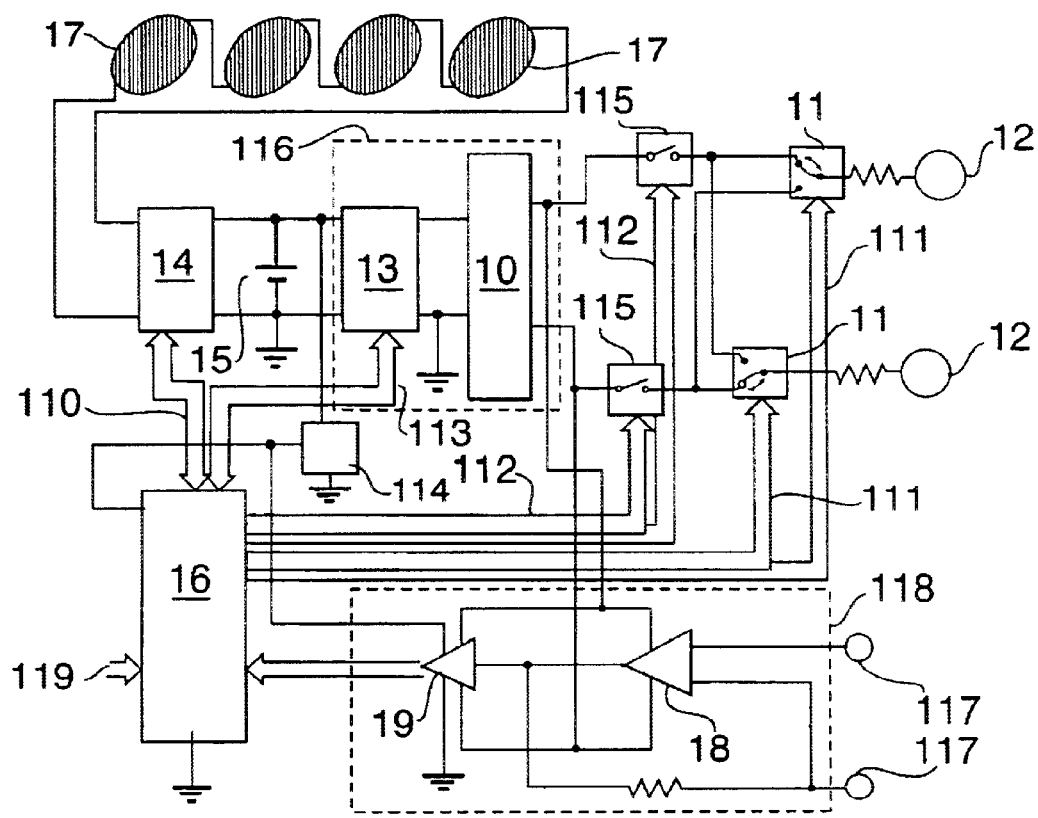
FIG. 5 illustrates a circuit architecture of the apparatus for the embodiment illustrated in FIG. 4.

With reference to FIGS. 4 and 5, an on-board power supply must rely on solar power to charge the local power energy source 15, for example, a one battery cell and to support generation of low amplitude differential electrostatic pulses. These pulses radiate through two electrodes 12.

Switched DC-to-DC converters are utilized as solar-cell-to-power-supply converters—solar converters—and transducer design—intermediate and output stages' converters.

The differential output port is connected to the radiating electrodes and a low power micro-controller provides control of the apparatus and drives electromagnetic transmissions.

A high voltage, inversing polarity, pulsed signal is applied to the radiating electrodes 12.

The pulse switches 115 are single-pole-single-throw, complementary-metal-oxide-semiconductor-field-effect-transistor switches. They should be rated for high supply voltages and are capable of controlling the duration of a pulse and its period. The control signal 112 of the pulse switches determines the duration of the pulses as well as their dynamically changing period.

The polarity switches 11 are single-pole-double-throw, complementary-metal-oxide-semiconductor-field-effect-transistor switches. They should be rated for high supply voltages and are capable of controlling whether the incoming pulse will be negative or positive voltage. The control signal 111 of the polarity switches permits sequential polarity inversion of the radiating electrodes from +V2 to −V2 and vice versa.

The basic material of the primary battery cell (local energy source) 15 is either lithium or polymer or any other lightweight rechargeable material. Depending on the application minimizing size, weight or both may be required.

The intermediate stage 13 is primarily a DC-to-DC converter, wherein the input supply is taken from the local energy source 15. A control signal 113 provides the instructions from the computing device thereby enabling of intermediate stage.

The output stage converter 10 sets a radiating voltage for the transducer. It accepts a single input voltage (GND, V1) and generates a differential output voltage (−V2, +V2) that is used to radiate the desired electrical field. In the one embodiment of the invention, V1 is 5 volts whereas V2 is between 12 and 15 volts, with a nominal value of 15V. The solar panels 17 are connected in series in order to potentially maximize input voltage to the solar converters 14.

A parallel arrangement of two sets of two DC-to-DC converters steps up the solar voltage to the charging voltage or the operating voltage, depending on the mode of operation selected, these components form the solar converter 14. Enabling the solar converter 14 is control signal 110 provided by the computing device.

The computing device, is typically a micro-controller 16 and supports tasks comprising electrostatic pulse transmission, battery charge control and detection.

A feedback configuration of high voltage operational amplifier is used to detect transmitted electrostatic pulses. This is the electric field detector 18.

A comparator arrangement 19 allows for the reading of the strength of an electric field, when this comparator arrangement is appropriately calibration.

The electric field sensor 118 comprises the electric field detector 18 and the comparator detector 19.

The linear regulator 114 regulates the energy supply to the logic circuitry of the apparatus.

Transmitter: Control and Spectral Analysis

In order to control the effects of an electric field blockage by an ion barrier, as identified in U.S. Pat. No. 4,211,980, two single-pole-single-throw switches 115 are placed at each pin of the differential output port electrode terminals of the output stage converter 10. This therefore limits the length of time the electric field is sustained.

Emission Control is enabled by the micro-controller's internal timer and interrupt routine. The timer generates interrupts and timing parameters which can be set to accommodate best achievable shark repulsion. Prior art suggests that the electro-receptors or the ampullae of Lorenzini, respond to frequencies ranging from 0.1–20 Hz. Therefore the timer may be designed to generate pulses having a similar level. The interrupt may also change the settings of the timer, in order that the frequency changes dynamically (chirp) may provide for maximum irritability and broader statistical range (if for example the receptors are more sensitive to particular frequencies when considering various shark species). The timer-interrupt routine contains the electromagnetic modulation algorithm. A timing diagram of the transmit control signals 111 and 112 is illustrated in FIG. 12.

Figure 12:
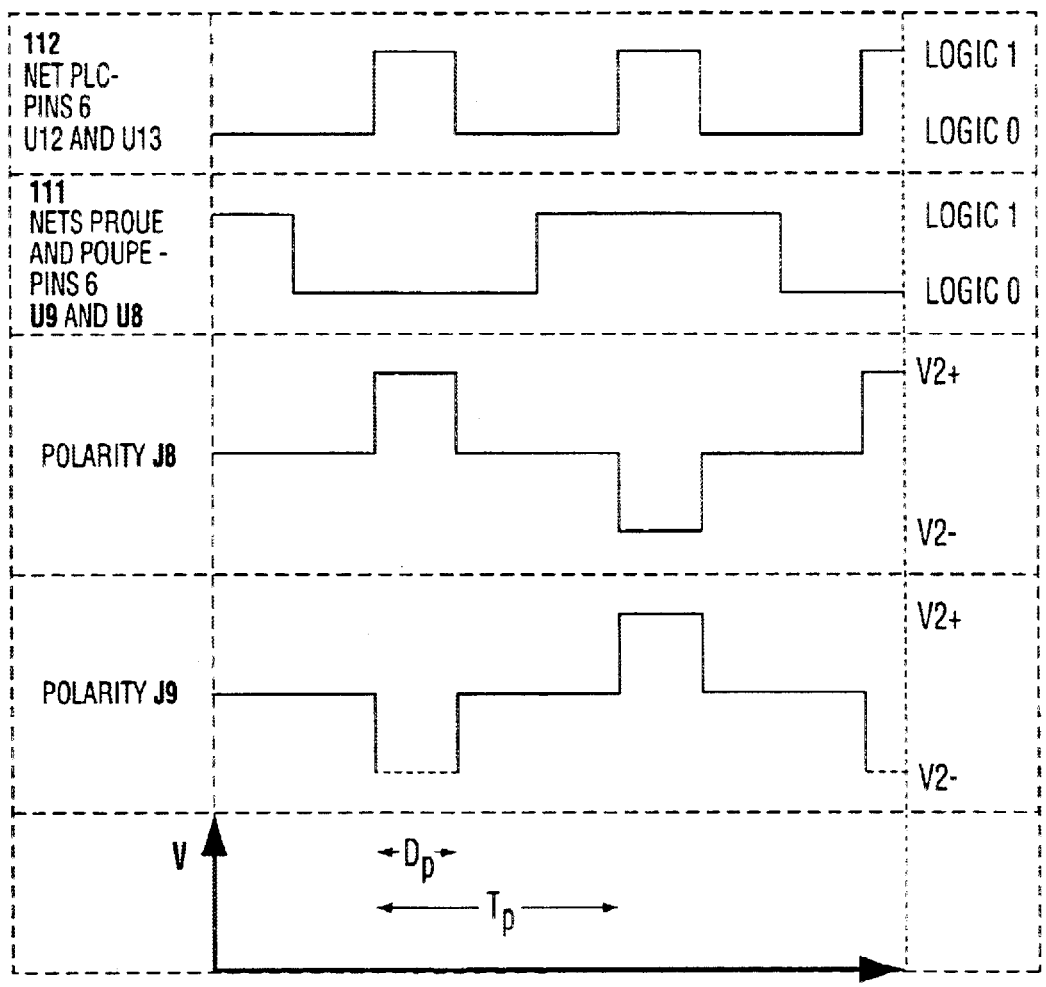
FIG. 12 illustrates a timing diagram of a sequence of transmission according to one embodiment of the present invention.

With reference to FIG. 12, polarity of the electrodes is inverted with the polarity switches 11 connected to each electrode using hardware inverted voltages while the pulse switch is retained off. The pulse switch is "ON" only for a duration $D_p$ that lasts between 2 and 10 ms, following control signal 112. The "ON" duration $D_p$ may be modulated or not by a specific pattern.

One comes back to Fourier Analysis to analyze the spectral content of the electric field function E(t), which is a scaled waveform that is similar to signals at connectors J8 or J9 depending on the reference, as illustrated in FIG. 12. Neglecting the effect of ions on the electric field, the E(t) waveform is only different in magnitude and is a function of the distance from the transducer. The units of measure in this figure are in V/m instead of V. The electric field E(t) thus is a periodic function, and so E(t) can be expressed as a Fourier Series.

$$E(t) = A(x, y, z) \sum_{k=-\infty}^{\infty} (F_k e^{jk 2\pi f_o t})$$

where $F_k$: Complex Fourier Coefficient of $k_{th}$ harmonic $f_o = f_p/2 = \frac{1}{2} T_p$: Fundamental frequency of the waveform, inversely proportional to the period of the waveform, that is 2 times the pulse A(x,y,z): Scalar value, function of the three-dimensional position from transducer Computations of coefficients $F_k$ from the third or fourth waveform according to FIG. 12, show that the energy of the electrical field signal E(t) is contained mostly at the fundamental frequency, that is $F_l$ (fundamental's coefficient) is the largest of all $F_k$. In this case the fundamental $f_o$ varies from 0.5 Hz to 25 Hz. Thus, period $T_p$ of the pulses is dynamically varied from 20 ms to 1 s for respectively covering the range of 25 Hz to 0.5 Hz, wherein a one cycle period consists of one positive pulse followed by one negative pulse.

Transmitter: Electrodes' Capacitance

Two pieces of conductive metal are effectively the radiating electrodes. Very thin, they each have an area large enough to generate the desired electrical field magnitude in all covered volume.

Figure 13:
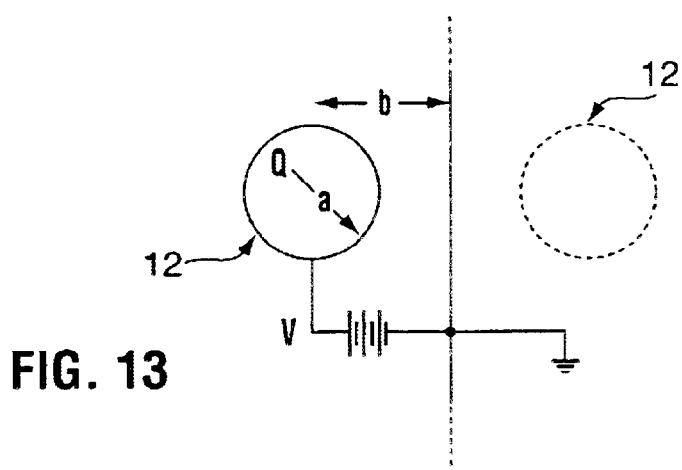
FIG. 13 illustrates a model of a capacitor consisting of a conducting sphere near a ground plane.

Calculation of the electrodes' capacitance is simplified by using a model that is well covered in the literature, for example in Cheng, David K., Field and Wave Electromagnetics, Second Edition, Addison-Wesley, 1992 (herein after Cheng). The conducting sphere near an infinite conducting plane as illustrated in FIG. 13. The object is to characterize the response of the electrodes when electric pulses are applied.

The capacitance is the ratio between the total charge accumulated on the surface of the sphere and the voltage, which is the electric potential difference between the sphere and the conducting plane. Using the method of images, (see Cheng):

$$C_s = Q_t/V = 4\pi\epsilon a[1+\alpha+(\alpha^2/(1+\alpha^2))+(\alpha^3/((1-\alpha^2)(1-(\alpha^3/(1-\alpha^3)))))\ldots]$$

where $C_s$: capacitance of a sphere with an infinite plane (F)

a: radius of the sphere (m)

b: ground plane-to-sphere-centre distance (m)

$\alpha$: a/2b $Q_t$: total charge on the sphere (C)

$\epsilon$: Permittivity, dielectric constant (F/m)

V: Voltage on the sphere (V)

If the conducting plane is replaced by an identical, mirrored sphere of opposite polarity, the potential V is twice as in the single-ended case (conducting plane present), yet for the same $Q_t$, as in the case of the ground plane. Capacitance of the electrodes thus is $$C_e = Q_t/2V = C/2$$

In one embodiment, the radiating electrodes are embedded in a water sport article such as a surfboard. The thin layer of isolating dielectric such as fiberglass keeps the system from unnecessary current discharge by direct contact with salt water, yet the dominant dielectric constant in which electromagnetic energy is stocked is the one of the salt water. The relative dielectric constant of salt water is of 72. Multiplying the permittivity in a vacuum ($\frac{1}{36}\pi \times 10^{-9}$ F/m) by the relative constant one finds the constant that must be used in the first formula presented (see above).

Computation of the above formula yields a capacitance of radiating electrodes of about 210.5 pF, or 421 pF when considering a virtual ground.

Transmitter: Transient State

Figure 6:
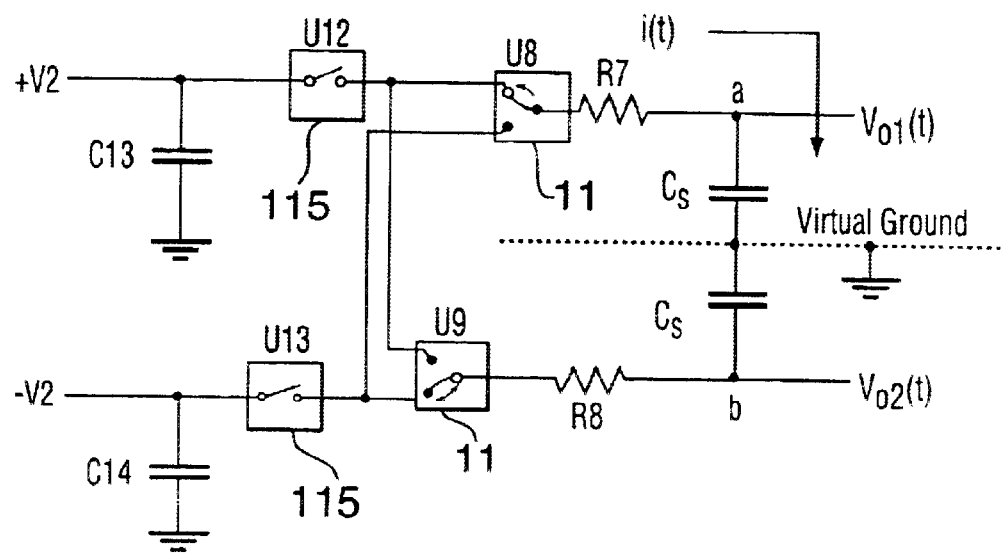
FIG. 6 illustrates a synoptic diagram of the extremely low frequency transducer according to one embodiment of the present invention.

Transient pulse analysis is made with a RC network as illustrated in FIG. 6. The total resistance $R_T$ at time t=0, when U12 and U13 are switched "ON" is calculated from the equation below.

$R_T$=U12 (or U13) ON-resistance (typically 20 ohms, maximum 35)+U8 (or U9) ON-resistance (typically 20 ohms, maximum 35)+R7

Whereas capacitance of one single electrode in regards to (virtual) ground is Cs=421 pF At t=0, when switches U12 and U13 are toggled ON, the source voltage is instantaneously plus or minus V2 and the capacitor $C_s$ initially is discharged.

On one side of the virtual ground, the voltage across the electrode capacitor is found using Kirchhoff's Current Law and Laplace Transfoms. Current at node a (or b, see FIG. 6) is $$i(t)=C_dV(t)/dt=[V2-V(t)]/R$$

where $V(t)=V_o1(t)=-V_o2(t)$ $C=C_s$ $R=R_T$

Using Laplace Transform to solve this equation, one finds that $$V(t)=V2(1-e^{-t/RC})+V(0)e^{-t/RC}$$

V(0) is the voltage across the electrode's capacitor at switch time.

Current then is found to be $$i(t)=(1/R)[V2-V(0)]e^{-t/RC}$$

Maximum current is $$i_{max}=[V2-V(0)]/R$$

Given that the maximum source current from the output stage converter is specified to be at 35 mA when the input current to last stage, from the intermediary converter, is of 253 mA, the available current to the output stage is 200 mA, one can perform the analysis using an available current of 20 mA.

It is a matter of setting the right value to optimize the charge rate, for example the smaller the value of R, the faster the system ramps up to radiation voltage. In one embodiment of the invention, V2 stands from 12 to 15 volts with a nominal value of 15 volts. V(0) is equal to zero, as the capacitor is discharged.

$$R_T = 15 \text{ volts}/20 \text{ mA} = 750 \text{ ohms}$$

At this point we can calculate the time constant $R_T C_s = 0.31575 \mu s$. The permanent state is reached when time reaches approximately 10 times the time constant. That yields a time to permanent state of less than 4 us. As seen in FIG. 12, each single-pole-double-throw switch must be toggled ON and OFF every half cycle of the wanted emission frequency. As previously analyzed, the shortest period of the radiated pulses is 40 ms (25 Hz), the switch time of U12 (or U13) is 20 ms. By comparing time to permanent state and switch time, one concludes that the extremely low frequency emitter reaches the maximum electric field magnitude with adequate timing.

Transmitter: Hardware Implementation

Figure 7:
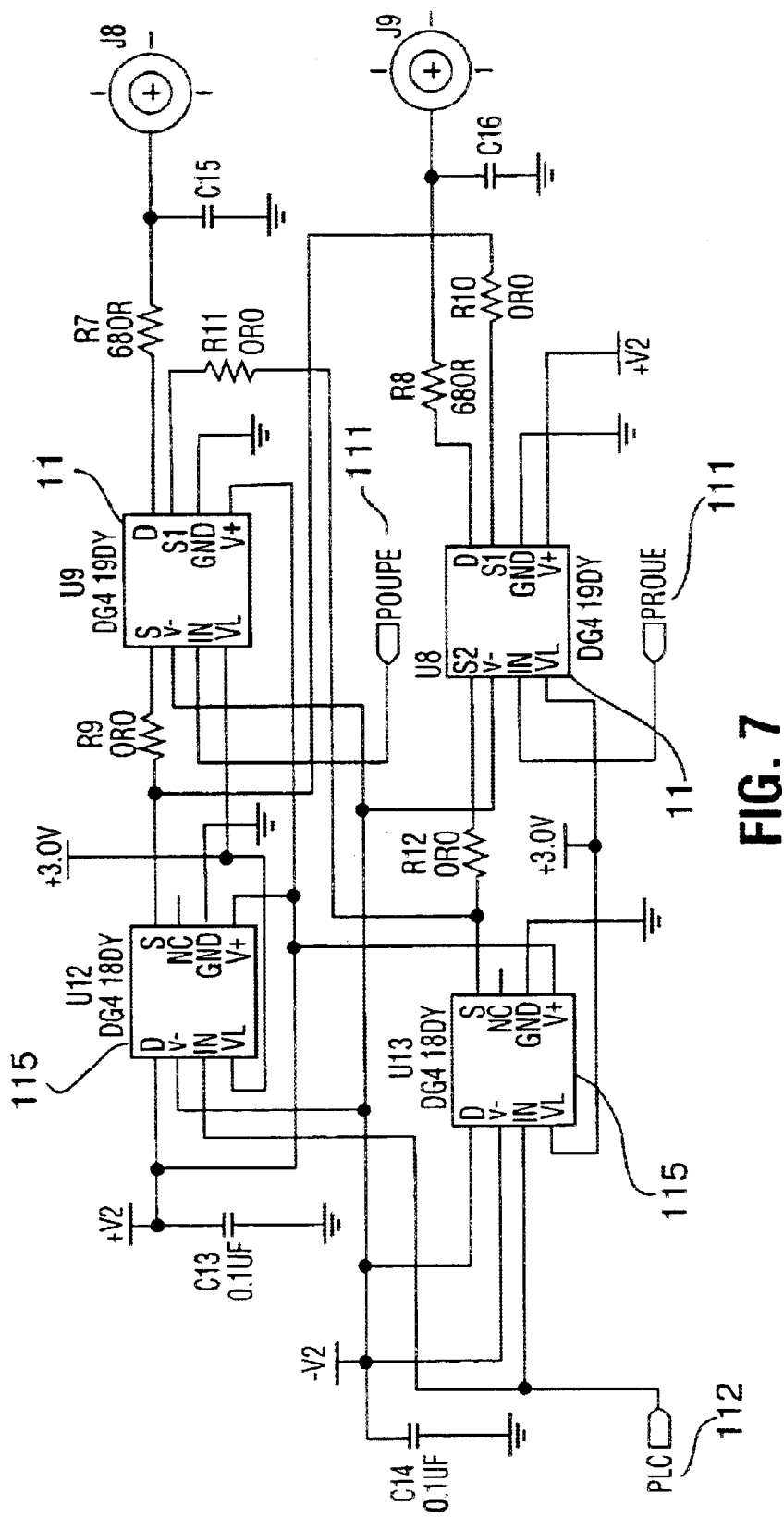
FIG. 7 illustrates a schematic diagram of the extremely low frequency transducer according to the embodiment illustrated in FIG. 6.

The hardware implementation of the transmitter circuit as analyzed above, is presented in FIG. 7. Considering a maximum ON resistance of 35 ohms for both U12 (U13) and U9 (U8), one selects the value of 680 ohms for R7 and R8. C15 and C16 have low capacitance and are installed to control the time constant. Nets PROUE and POUPE are effectively the polarity control signal 111.

Power Conversion Design: Architecture

Other than the analysis of the transmitter, other very important considerations of the invention relates to power conversion. In one embodiment of the invention, the main bus, that is the battery bus, has a normal mode nominal voltage of 3.8 volts. One can separate the power conversion design into four distinct sections: the solar conversion, intermediary stage, output stage, and control stage. The intermediary stage and output stage together from the transmitter converter. In addition, there are four modes of operation of the device: normal, battery only, charge, and storage mode.

Figure 8:
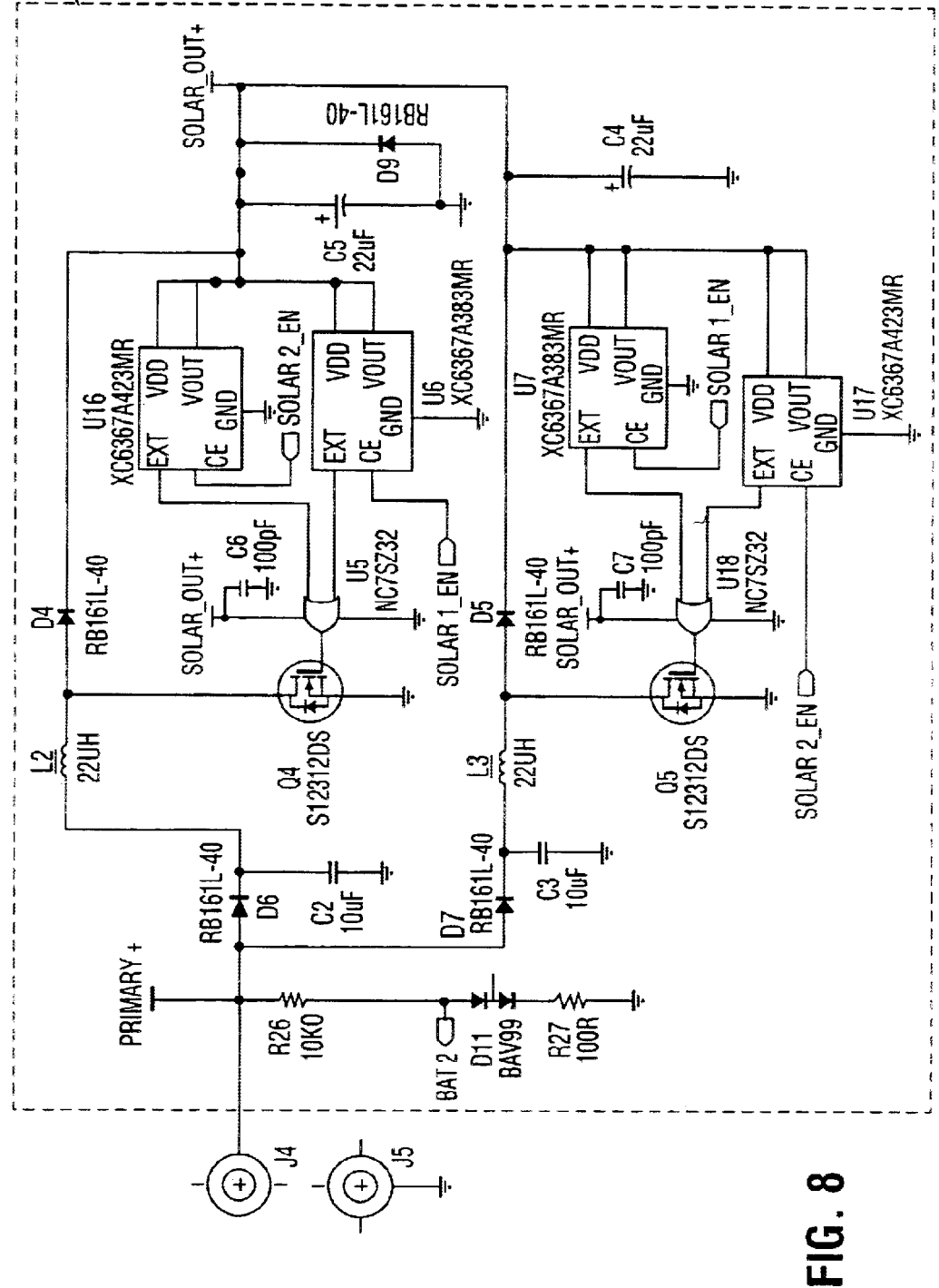
FIG. 8 illustrates a schematic diagram of the solar conversion stage of the power supply according to one embodiment of the present invention.

In one embodiment of the invention, the solar conversion stage 14 represented schematically in FIG. 8, is interconnected to four solar panellized wafers of diameter equal to or less than 10 cm. These solar panels are connected in series to obtain a nominal maximum power primary voltage of approximately 1.9V, or potentially a minimum of approximately 1.8V. The positive and negative ends of the arrangements in series of the solar panels are connected to connectors J4 and J5 respectively.

Maximum power current of the solar panels stands from 1.9 to 2A. Power budget calculations are made using half of this current, (0.95–1A). In other words, a 3 dB loss is factored in to take into account the angle of incidence, the reflection of the water, and the reflection on the fiberglass which may be covering the solar panels.

With reference to FIG. 8, in normal mode, the primary voltage is stepped up to the nominal voltage of 3.8V. In charge mode, the primary voltage is stepped up to 4.2V. To perform the step-up DC-to-DC conversion, booster converter circuits are implemented. Four DC converters are implemented in the solar conversion stage.

Each converter includes:
One low equivalent-series-resistance inductor (typical value of 22 $\mu$H, L2 or L3)
One low equivalent-series-resistance input capacitor (typical value of 22 $\mu$F, C2 or C3)
One low equivalent-series-resistance output capacitor (typical value of 22 $\mu$F, C4 or C5)
One integrated circuit driver/controller. This part includes the switch controller (clock frequency at 300 kHz) and output voltage monitoring circuitry (U6, U7, U16, or U17)
One power MOSFET transistor. The switch (Q4 or Q5)
One Schottky Diode (D4 or D5), to insure current flow never goes backwards, for fly-back effect and in cases when there is no solar power available. Schottky diodes also have low bias voltage.

The inductor value and the switching frequencies (and duty ratio) are parameters of importance for setting the output voltage in regards to the input voltage. The driver stages use pulse width modulation for heavier loads and dynamically adjust the duty ratio to regulate the output voltage. When the load is lighter, for example in the case when the battery is fully charged, the drivers use pulse frequency modulation to control the output voltage. The frequency of the oscillator integrated in the driver/controller is 300 KHz.

The input capacitors C2 and C3 are placed to remove unwanted spurious on the solar bus, whereas the output capacitors C4 and C5 filter out all AC components, letting through only the DC component. The DC component is at 3.8V or 4.2V, depending of the mode of operation. Therefore, the average value of the output power waveform is 3.8V or 4.2V for normal and charge modes, respectively.

The current delivered by the solar panels nears 1A, with an efficiency of 85%, this would yield a theoretical output current of over 400 mA at 3.8V. This is well above the rated output current (200 mA) of each individual booster converter arrangement. Thus, in one embodiment of the invention, two sets of two converters, one set per mode (normal and charge) are implemented in parallel, wherein one converter arrangement deals with half of the current from the solar panels. U6 and U7 support normal mode conversion whereas U16 and U17 support charge mode conversion. Only one of the two sets is enabled at a time. The discrete components enumerated above, inductors, switches and capacitors, are shared and used for both modes of operation.

U5 and U18 are logic OR gates. When a driver/controller integrated circuit- U6, U7, U16, U17, or U10, the switch driver EXT signal is pulled low. The OR gates in the solar conversion stage allows for the sharing of the switches between driver/controllers.

Detection of solar energy is made with the shunt arrangement of R26, D11, and R27 as illustrated in FIG. 8. When there is no solar energy, no voltage is present on net PRIMARY+, diode D11 is not polarized and thus voltage at net BAT2 is below 1.4V. BAT2 is monitored by the computing device. When solar energy is detected, the step-up converters regulate the main bus voltage as described above.

The main bus voltage corresponds to the nominal voltage of the utilized battery. In this case, this voltage is 3.8V. In one embodiment of the invention, the raw material of the battery is either lithium or polymer, in order that the battery is rechargeable. The battery package is fitted with protection circuits such as component part number MC33348.

Power Supply: Current Sensor for Charge Detect

Figure 9:
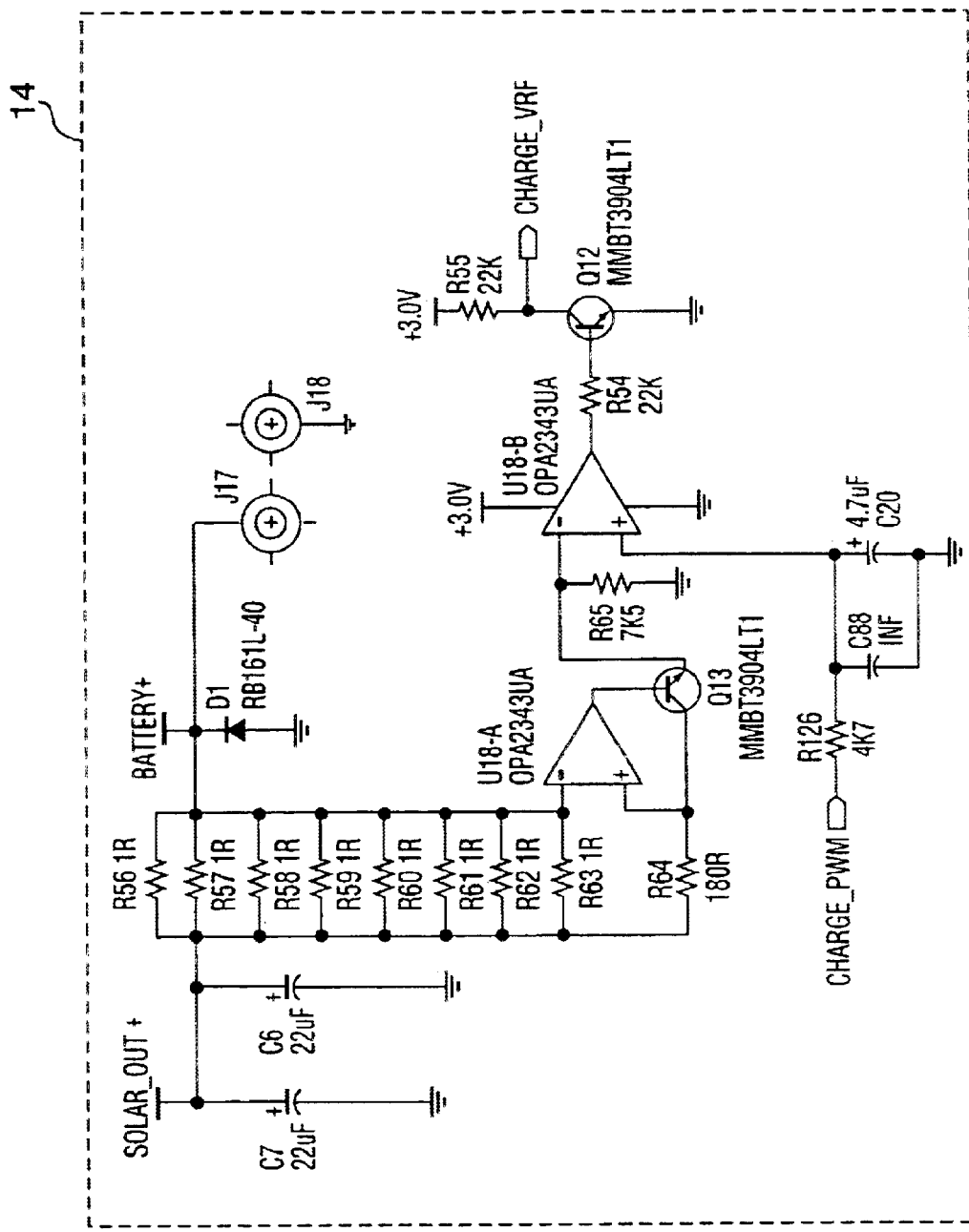
FIG. 9 illustrates a schematic diagram of the solar conversion stage's current sensor according to one embodiment of the present invention.
Figure 10:
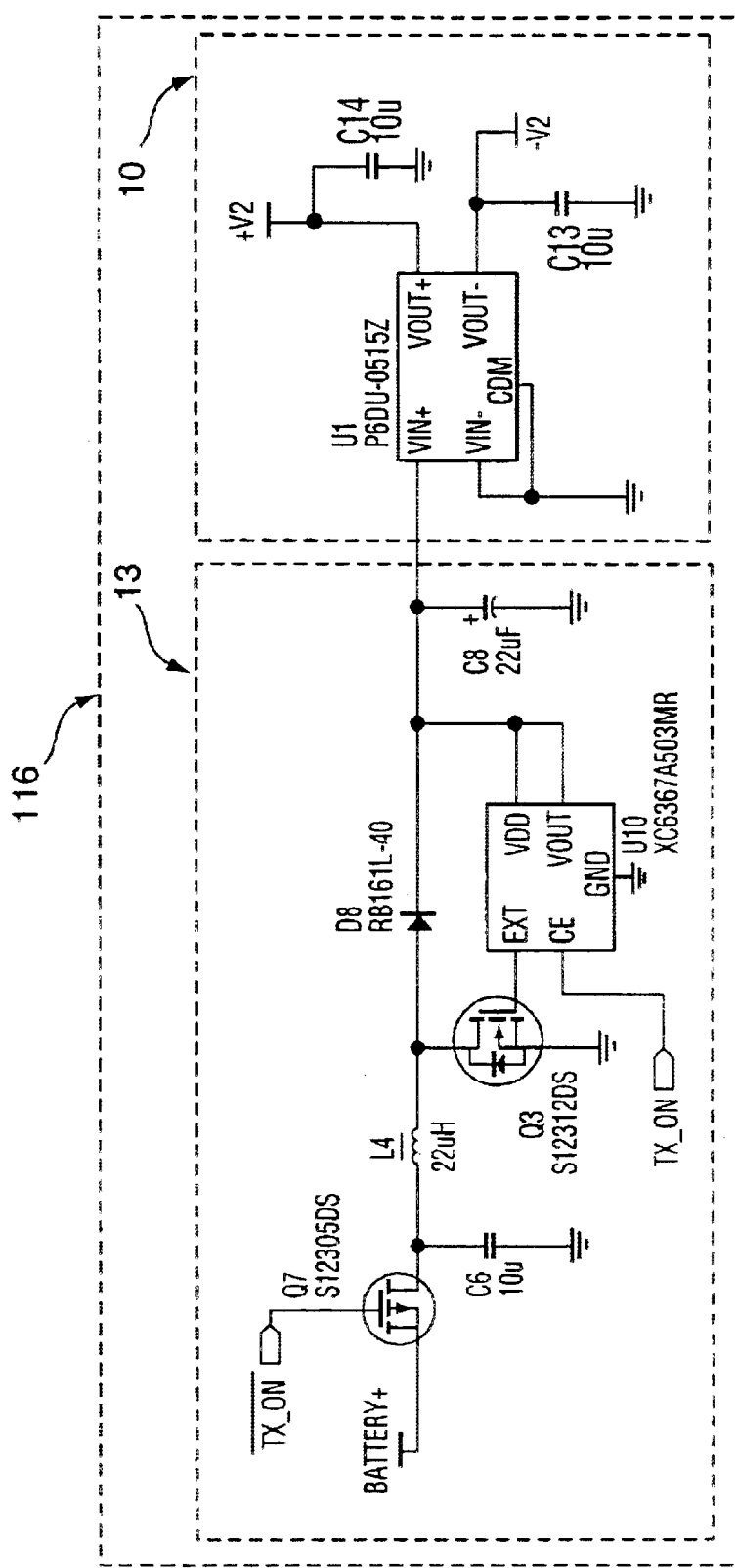
FIG. 10 illustrates a schematic diagram of the intermediary and output stages of the power supply according to one embodiment of the present invention.

In order to detect whether the battery is fully charged or not, current sensing circuitry is implemented as illustrated in FIG. 9. Resistors R56–R63 in parallel, yield a resistance of 0.125 ohm. In charge mode, the current going through is 263 mA, as shown on Table 2. Voltage across the parallel arrangement is 33 mV. In steady state, there is the same voltage across R64. That is to say that the current going through the 180 ohm resistor is 0.2 mA. This current also flows through Q13 and R65. Value for R65 is selected such that nominal current (263 mA) corresponds to the midrange of the dynamic voltage range of the comparator U18-B: 1.5V. Hence the value of R65 is 7.5K ohms. The pulse width modulated signal CHARGE_PWM is filtered through R126, C88 and C20. The computing device controls the duty ratio and with the comparator U18-B, an analog-to-digital converter is effectively implemented, thereby completing the current sensor arrangement. By varying the duty cycle and reading logic signal CHARGE_VRF, the computing device can assess current magnitude.

When the current across R56–R63 is read to be much lower than nominal current 263 mA, and the signal BAT2 still indicates solar energy is available, it means the battery is fully charged.

Modes of Operation and States of Operation of the Apparatus

Figure 14:
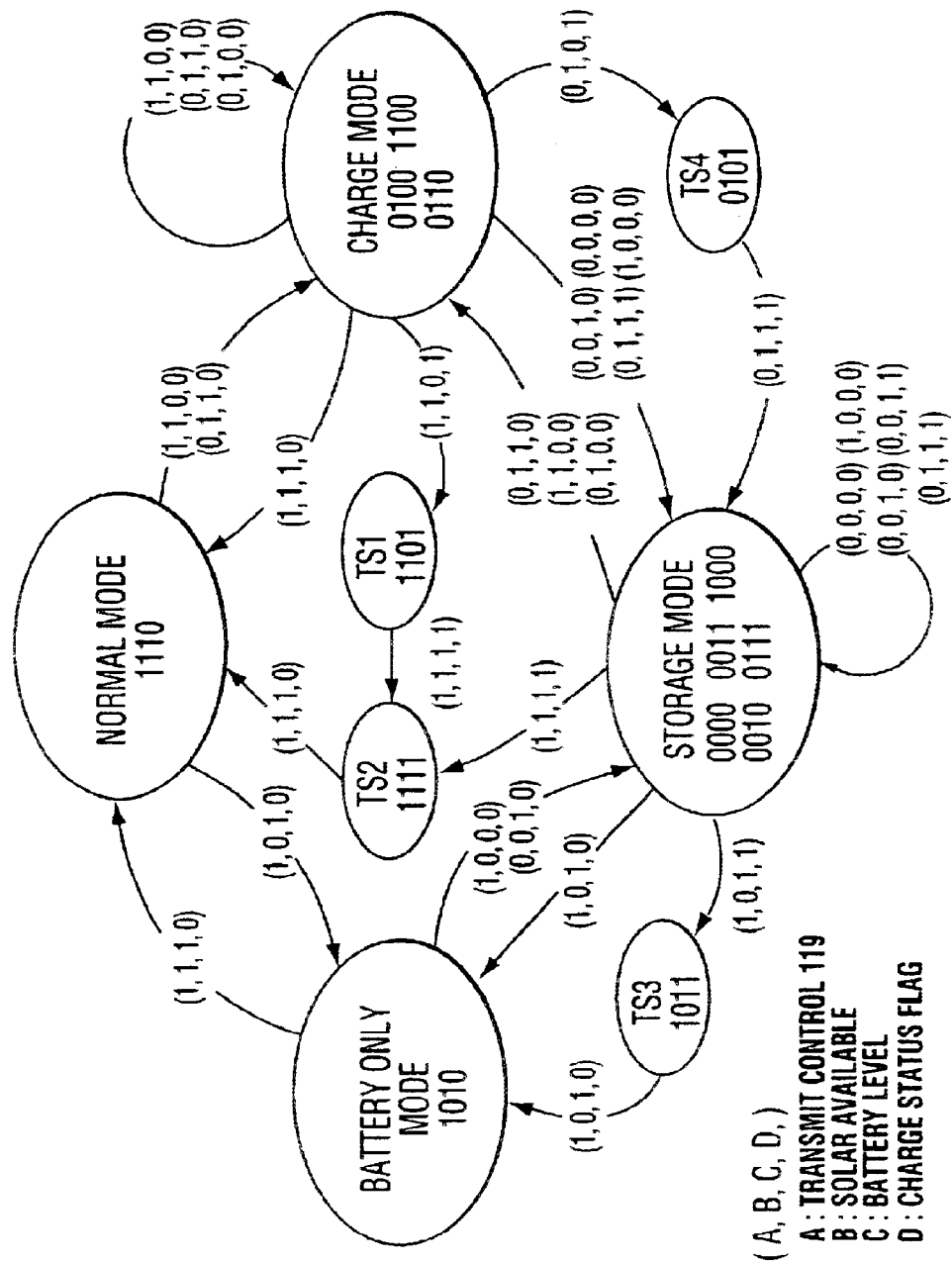
FIG. 14 illustrates a state diagram for operation modes of the apparatus according one embodiment of the present invention.

With reference to FIG. 14, the state of operation of the apparatus is characterized by 4 state bits. The first bit, starting from the left, is the TRANSMIT CONTROL bit from control signal 119 as also shown on FIGS. 2 and 5. This control signal comes from an electromechanical toggle switch or from a water sensor that detects presence of salt water. It indicates to the system that extremely low frequency pulse transmission is requested.

The second bit SOLAR AVAILABLE indicates whether solar energy is available and whether recharging is requested by the computing device. This SOLAR AVAILABLE bit is set or reset, depending on two flags that are processed through a logic AND operation. The first one is set or reset according to the voltage level detected, high or low, respectively, at net BAT2. The second flag is the result from a logic OR operation between the solar override flag, which is a flag controlled by computing device and the TRANSMIT CONTROL bit. The solar override flag is used by the computing device to implement a specific pattern in the charge-discharge scheme. For example, it is known that the life span of a typical lithium battery is optimized when full discharge and charge cycles are imposed, rather than sequential small gradient charge/discharge cycles. So even if solar energy is available, the code routine could reset the SOLAR AVAILABLE bit, with the solar override flag reset, to keep the battery from recharging (no CHARGE MODE) until it is completely discharged (see BATTERY LEVEL), thereby potentially preserving battery life span. The TRANSMIT CONTROL bit is computed so that NORMAL MODE operation is enabled even with a specific charge/discharge scheme. If applicable, solar override flag is reset from states 0111 and 1110 and set when BATTERY LEVEL becomes low.

The third bit, BATTERY LEVEL, is set or reset depending on the battery monitor indicator and whether transmission is allowed by the computing device. The BATTERY LEVEL bit is set or reset depending on two flags that are processed through a logic AND operation. The first flag is set or reset from net BATTERY+ monitored by the computing device; when the battery level becomes too low, this bit is reset. The second flag, the battery level override flag, is used by the computing device to implement a specific pattern in the charge-discharge scheme, as explained above. So even if the battery level is well above critical discharge level, the code routine could reset the BATTERY LEVEL bit, with the battery level override flag reset, to keep the battery from discharging (no BATTERY ONLY MODE or NORMAL MODE) until it is completely charged (see CHARGE STATUS FLAG), thereby potentially preserving the battery life span. If applicable, battery level override flag is reset whenever BATTERY LEVEL bit is reset and set whenever CHARGE STATUS FLAG is set.

The last bit on the right is the CHARGE STATUS FLAG. This bit is set when charge current has decreased even if there is still plenty of energy detected on BAT2, as explained above.

In STORAGE MODE there are five potential states:
Depending of the event, state 0000 can go to two different states: 1000, 0100.
Depending of the event, state 1000 can go to two different states: 1100, 0000.
Depending of the event, state 0010 can go to two states: 1010, 0000, 0110.
Depending of the event, state 0011 can go to three states: 0010, 1011, 0111.
Depending of the event, state 0111 can go to three states: 0011, 1111, 0110

States 0011 and 0111 are states where more than one bit is changed during an event, going to TS3 and TS2, respectively. Each time one of these states leaves storage mode, the CHARGE STATUS FLAG is reset.

In CHARGE MODE there are three potential states:
Depending of the event, state 0100 can go to four different states: 1100, 0110, 0000,0101.
Depending of the event, state 0110 can go to three different states: 0111, 1110, 0010.
Depending of the event, state 1100 can go to three different states: 1110, 0100, 1000, 1101

Only one state is provided in NORMAL MODE: depending on the event, state 1110 can go to a different state: for example 1100, 0110, 1010.

Only one state is provided in BATTERY ONLY MODE: depending on the event, state 1010 can go to a different state: for example 1110, 1000, 0010.

State 0101 is transient state TS4 between CHARGE and STORAGE MODE, only when the battery level override flag is kept reset (for full charge cycle, see above) and the CHARGE STATUS FLAG just gets set, while transmission is not requested. Battery level override then is set to allow the BATTERY LEVEL bit to be set and allow the system to go to STORAGE MODE.

State 1101 is transient state TS1 between CHARGE and transient state TS2, only when the battery level override flag is kept reset (for full charge cycle, see above) and the CHARGE STATUS FLAG just gets set, while transmission is requested. Battery level override then is set to allow the BATTERY LEVEL bit to be set and allow the system to go to transient state TS2.

State 1111 is transient state TS2 that leads to NORMAL MODE. In this state, the CHARGE STATUS FLAG is reset to allow for another discharge/charge cycle.

State 1011 is transient state TS3 that leads to BATTERY ONLY MODE.

States 0001, 1001 are not possible and would indicate a malfunction in one of the current sensor, solar detector, or the battery level monitoring circuitry.

CHARGE STATUS FLAG is reset when coming out of storage mode. The events that set this flag are from the CHARGE MODE; when there is solar energy available and the current sensor detects low charge current, CHARGE STATUS FLAG is set. This will limit the transfer to charge mode every time there is sun when the battery is fully charged. The goal is to prevent damage to the battery and to allow the battery to cycle between fully charged and discharged states. CHARGE STATUS FLAG can also be set in the charge override condition when BATTERY LEVEL is kept low by battery level override flag, as explained above.

In STORAGE MODE, power net 3.0V is shut off (to GND) and nets TX_ON, SOLAR1_EN, and SOLAR2_EN, are all logic low. Pulse width modulation signal CHARGE_PWM and RX_PWM are disabled. The computing device goes into sleep mode and periodically reads the battery level BATTERY+ voltage and solar energy sensor BAT2. If the battery level is sufficiently high, a request for transmission will pull the computing device from sleep mode and generate an interrupt.

In CHARGE MODE, power net 3.0V is up, nets TX_ON, SOLAR1_EN are logic low, SOLAR2_EN is logic high. Pulse width modulation signal CHARGE_PWM is enabled and RX_PWM is disabled.

In NORMAL MODE, power net 3.0V is up, and nets TX_ON and SOLAR1_EN are logic high. SOLAR2_EN is logic low. Pulse width modulation signals CHARGE_PWM and RX_PWM are enabled.

In BATTERY ONLY MODE, power net 3.0V is shutoff, nets TX_ON, SOLAR1_EN are logic high, SOLAR2_EN is logic low. Pulse width modulation signals CHARGE_PWM and RX_PWM are disabled.

Note that the 3.0V net is drawing current from the linear regulator 114 through a transistor switch and that the micro-controller VCC pin(s) is directly connected to output of 114.

With reference to FIG. 7, the last stage DC-to-DC converter U1 requires an input voltage of 5V. Since the battery voltage is at 3.8V, an intermediary stage is required to increase the voltage.

Aside from the output voltage, the configuration of U10 is very much like the solar conversion stage (see above). It comprises a booster converter-step-up switcher, wherein the main components are listed above. However, the regulator follower controller adjusts its duty ratio so the output voltage is at 5 V.

The last stage must provide fairly high voltage in order to generate an electric pulse effectively. This is performed by a DC-to-DC converter U1 that accepts 0 to +5V as input and converts it to a nominal differential output voltage of −15V to +15V.

Computing Device

A simple low dropout linear regulator 114 sets the control stage's voltage to 3.0V (power for the computing device). There are few active components that draw current form this node, they are:

The micro-controller 16 (computing device). Maximum current of the computing device is evaluated to be equal or less than 1.6 mA with 3.0 volt supply. The micro-controller contains and executes the routines in accordance with the state machine diagram illustrated in FIG. 14. It also looks after generating the pulse width modulation signals, the logic control signals and reading the indicator signals.

3 rail-to-rail amplifiers U18-A, U18-B, and U11, for a total quiescent current 3×1.25 mA=3.75 mA (one can make the note that the current is rated for 5.0V whereas 3 volts is the supply in the present circuit). These are used in the detection circuit illustrated in FIGS. 9 and 11.

Additional control transistors such as Q7 that represent a consumption estimate of 3 mA. At least one other transistor is required to switch ON or OFF the 3.0V supply rail.

Total current consumption for this stage then is: 1.6+3.8+3=8.4 mA. One selects 10 mA in further calculations.

Power Budget

Power budget calculations for each of the modes of operation of this embodiment of the present invention are provided in Tables 1–4.

As previously mentioned the four operating modes of the system are: operating mode with solar energy available (NORMAL MODE), non-operating with solar energy available (CHARGE MODE), operating mode without solar energy (BATTERY ONLY MODE), and non-operating mode without solar energy (STORAGE MODE).

For this analysis, time of autonomy means the time a battery takes to discharge down to 90% of its capacity (from a fully charged state), for a given battery capacity and current draw. Capacity is assumed to have a linear function in regards to current and time:

Time Autonomy (in hours)=10%* Capacity (in Ah)/(0.001*Current in mA)

Converter efficiency parameter is used to compute input and output currents, for a given input and output voltages. Efficiency is:

Efficiency={(Output Current X Output Voltage)/(Input Current X Input Voltage)} X 100%.

Power budget calculations of NORMAL MODE are presented in Table 1. In this analysis, 60% of the solar converter efficiency has been factored in for the solar converter—as opposed to the rated 85%—for the following reasons:

1. Input voltage is lower than $0.6V_{out}$ as specified in data sheets of switched regulator, $V_{out}$ being the output voltage of converter.
2. Input current would yield higher current than maximum specified current; converter is saturated in current and maximum power is exceeded.
3. U5 and U18 of are not in application circuits of vendor of U6, U7, U16 and U17.

In NORMAL MODE, maximum output current at the intermediate stage is assumed to be 200 mA. As it can be seen in Table 1, 30 mA are taken off the battery in NORMAL MODE, which yields a very long utilisation time.

Power budget calculations of CHARGE MODE are presented in Table 2., for instance in the case where the device is not transmitting and there is sunlight. In this case, 60% of solar converter efficiency has been factored in for the solar converter—as opposed to the rated 85% based on the first two reasons identified for the NORMAL MODE (given above).

The charging voltage must be higher than the battery's nominal voltage. The manufacturer of a battery which can be used with the apparatus of the present invention, specifies that the charging voltage is 4.2V. In this case U6 and U7 are disabled whereas U16 and U17 are functioning. The charging time calculation uses a linear relationship between time, current, and percentage of capacity to charge for a given capacity. It is the same relationship as the one used to calculate the Time of Autonomy.

Power budget calculations of BATTERY ONLY MODE are presented in Table 3, for instance in the case where the device is transmitting pulses and there is no sunlight available.

Power budget calculations of STORAGE MODE are presented in Table 4, for instance in the case where the device is switched OFF and there is no sunlight available.

Figure 11:
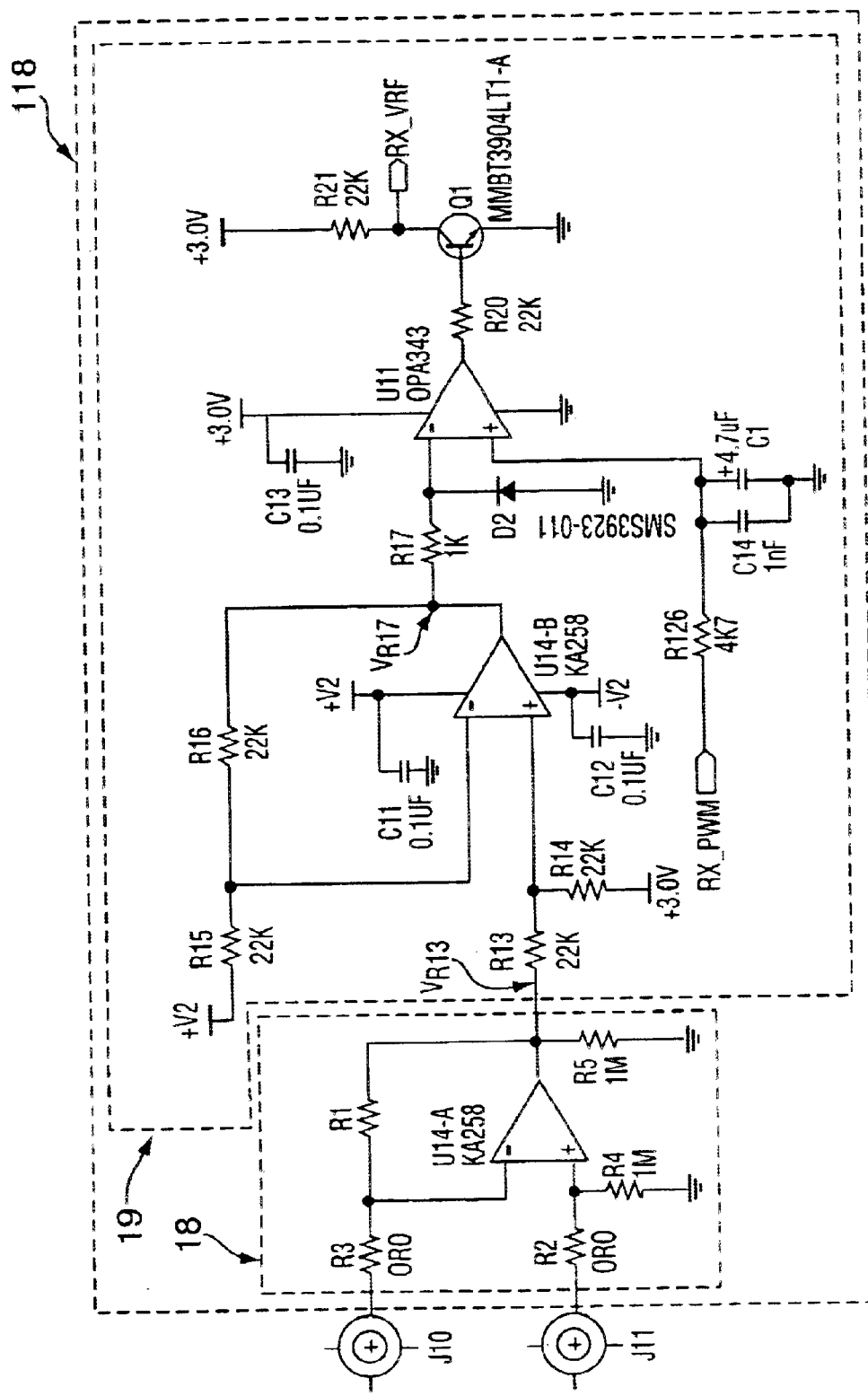
FIG. 11 illustrates a schematic diagram of the extremely low frequency electric field sensor according to one embodiment of the present invention.

As illustrated in FIG. 5 and further illustrated in FIG. 11, the circuitry of the electrical field detection means 118, is an add-on feature that permits the measurement of the magnitude of the ambient electrostatic field. Sensor 18 amplifies potential gradient at RX electrodes 117—each of them connected to J10 or J11. The gain of operational amplifier U14-A is adjusted with R1.

The voltage signal at R5 has a [−V2,V2] dynamic range. The signal must be scaled down to at most 3.0V and out of the negative voltage (output range to 0–3V). A summer configuration U14-B allows to implement changes:

$$3V+[-V2,V2]-V2=V_{R17}$$

In one embodiment of the invention, $$V_{R17}=-12V+[-15,+15]=[-27,3]V$$

Note that gain in U14-A can also be set with R1 so that range of $V_{R13}$ does not go from rail-to-rail but has narrower dynamic range.

For negative voltages, D2 is polarized and R17 limits the current. The voltage at negative pin of U11 is equal to the polarization voltage of D2, which is low. The pulse width modulation signal RX_PWM is filtered and combined with the comparator U11, thus one can detect the electrostatic energy. Detection is synchronized with transmissions so that RX_VRF is read at times when $V_{R17}$ is at a maximum value. This reading occurs during $D_p$ time slot as shown in FIG. 12, when nearby transmit electrode 12 radiates a positive field close to the positive receive electrode 117.

The embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

| | primary voltage | step-up converter 1 | Total Main Bus input current (mA) | main bus-Battery (3.8 Volts) | Total consumption (mA) | intermediate stage | output stage |
|---|---|---|---|---|---|---|---|
| current out | 500.00 | | 145.26 | | | 309.60 | 200.00 |
| voltage out | 1.84 | | 3.80 | | | 3.80 | 5.00 |
| effciency | | 0.60 | | 290.53 | 319.60 | 0.85 | |
| | | step-up converter 2 | | Current taken off the battery (mA) | | control stage | |
| current out | 500.00 | | 145.26 | 29.07 | | 10.00 | 10.00 |
| voltage out | 1.84 | | 3.80 | Battery capacity (Ah) | | 3.80 | 3.00 |
| efficiency | | 0.60 | | 3.20 | | | |
| | | | | Fudge Factor on battery capacity | | | |
| APPLICATION CIRCUIT | | | | 1.00 | | | |
| current out | 435.00 | | 199.31 | Estimated autonomy in time (h) | | | |
| voltage out | 1.80 | | 3.30 | 11.01 | | | |
| efficiency | | 0.84 | | | | | |

TABLE 2

| | primary voltage | step-up converter 3 | Total Main Bus input current (mA) | main bus-Battery (3.8 Volts) | Total consumption (mA) | intermediate stage | output stage |
|---|---|---|---|---|---|---|---|
| current out | 500.00 | | 131.43 | | | 0.00 | 0.00 |
| voltage out | 1.84 | | 4.20 | | | 4.20 | 5.00 |
| efficiency | | 0.60 | | 262.86 | 10.00 | 0.85 | |
| | | step-up converter 4 | | Current pumping in the battery (mA) | | control stage | |
| current out | 500.00 | | 131.43 | 252.86 | | 10.00 | 10.00 |
| voltage out | 1.84 | | 4.20 | Battery capacity (Ah) | | 4.20 | 3.00 |
| efficiency | | 0.60 | | 3.20 | | | |
| | | | | Fudge Factor on battery capacity | | | |
| | | | | 1.00 | | | |
| | | | | Estimated charging time (h) | | | |
| | | | | 1.27 | | | |

TABLE 3

| | primary voltage | step-up converter 1 | | Total Main Bus input current (mA) | main bus-Battery (3.8 Volts) | Total consumption (mA) | intermediate stage | | output stage |
|---|---|---|---|---|---|---|---|---|---|
| current out | | 0.00 | | 0.00 | | | 309.60 | | 200.00 |
| voltage out | | 1.84 | | 3.80 | | | 3.80 | | 5.00 |
| efficiency | | | 0.60 | | 0.00 | 319.60 | | 0.85 | |
| | | step-up converter 2 | | | Current taken off the battery (mA) | | control stage | | |
| current out | | 0.00 | | 0.00 | 319.60 | | 10.00 | | 10.00 |
| voltage out | | 1.84 | | 3.80 | Battery capacity (Ah) | | 3.80 | | 3.00 |
| efficiency | | | 0.60 | | 3.20 Fudge Factor on battery capacity 1.00 Estimated autonomy in time (h) 1.00 | | | | |

TABLE 4

| | primary voltage | step-up converter 1 | | Total Main Bus input current (mA) | main bus-Battery (3.8 Volts) | Total consumption (mA) | intermediate stage | | output stage |
|---|---|---|---|---|---|---|---|---|---|
| current out | | 0.00 | | 0.00 | | | 0.00 | | 0.00 |
| voltage out | | 1.84 | | 3.80 | | | 3.80 | | 0.00 |
| efficiency | | | 0.60 | | 0.00 | 0.50 | | 0.85 | |
| | | step-up converter 2 | | | Current taken off the battery (mA) | | control stage | | |
| current out | | 0.00 | | 0.00 | 0.50 | | 0.50 | | 0.50 |
| voltage out | | 1.84 | | 3.80 | Battery capacity (Ah) | | 3.80 | | 3.00 |
| efficiency | | | 0.60 | | 3.20 Fudge Factor on battery capacity 1.00 Estimated autonomy in time (h) 640.00 | | | | |

I claim:

1. An apparatus for controlling aquatic creatures in a body of water, said apparatus comprising:
  a) a power supply;
  b) a solar conversion means electrically connectd to the power supply, for supplying and regulating a desired level of energy within the power supply;
  c) a first electrode and a second electrode;
  d) a controllable switch means for connecting the first and second electrodes selectively to an output of the power supply; and
  e) a computing device means collecting at least one signal that urovides information relating to charge status of the power supply, said comnutinu device means deter- minifla a mode of operation of said solar conversion means based on said at least one signal and providing control signals to the controllable switch means and the solar conversion means thereby controlling conversion of solar energy into a form compatible with the power supply and controlling the application of elecirical energy to the first and second electrodes by the controllable switch means;
wherein the apparatus is in operational contact with the body of water.

2. The apparatus according to claim 1, further comprising a second controllable switch means responsive to control signals from the computing device means, said second controllable switch means for reversing the polarity of the electrical energy applied to the first and second electrodes.

3. The apparatus according to claim 1, wherein the solar conversion means comprises at least one solar panel and a solar converter.

4. The apparatus according to claim 1, wherein the first controllable switch means is a single pole single throw CMOS switch.

5. The apparatus according to claim 2, wherein the second controllable switch means is a single pole double throw CMOS switch.

6. The apparatus according to claim 1, wherein the power supply is a DC power supply.

7. The apparatus according to claim 1, wherein the computing device means is a microprocessor, said computing device means being programmed to perform tasks including, calculating and implementing a strategy for power usage and for providing the control signals to the controllable switch means for controlling frequency, duration and voltage of the electrical energy applied to the first and second electrodes.

8. The apparatus according to claim 1, wherein said apparatus is embedded within a surfboard.

9. The apparatus according to claim 1, wherein said apparatus is installed in a life jacket.

10. The apparatus according to claim 1, wherein said apparatus is interconnected to a buoy.

11. Use of the apparatus according to claim 1 for the control of aquatic creatures.

12. The use according to claim 11, wherein the aquatic creatures are sharks.

13. A method of controlling aquatic creatures comprising the steps of placing the apparatus according to claim 1 in operational contact with a body of water and activating said apparatus.

14. The apparatus according to claim 1, further comprising an electric field detector means, said electric field detector means for collecting an indication of an electric field produced by the apparatus and sending said indication to the computing device means.

* * * * *

UNITED STATES PATENT AND TRADEMARK OFFICE
CERTIFICATE OF CORRECTION

PATENT NO. : 6,837,182 B2
DATED : January 4, 2005
INVENTOR(S) : Hugo Leblanc

It is certified that error appears in the above-identified patent and that said Letters Patent is hereby corrected as shown below:

Title page,
Item [74], *Attorney, Agent, or Firm*, "*Firm*-Salwanchik" should read
-- *Firm*-Saliwanchik --.

Column 9,
Line 59, "$(1+\alpha^2))$" should read -- $(1-\alpha^2))$ --.

Column 19,
Line 64, "urovides" should read -- provides --.
Line 65, "comnutinu" should read -- computing --.
Lines 65 and 66, "determinifla" should read -- determining --.

Column 20,
Line 55, "elecirical" should read -- electrical --.

Signed and Sealed this

Twenty-third Day of August, 2005

JON W. DUDAS
*Director of the United States Patent and Trademark Office*

UNITED STATES PATENT AND TRADEMARK OFFICE
CERTIFICATE OF CORRECTION

PATENT NO. : 6,837,182 B2  Page 1 of 2
APPLICATION NO. : 10/194525
DATED : January 4, 2005
INVENTOR(S) : Hugo Leblanc It is certified that error appears in the above-identified patent and that said Letters Patent is hereby corrected as shown below:

Patent Reads:

Sheet 5 of 11, Fig. 7:

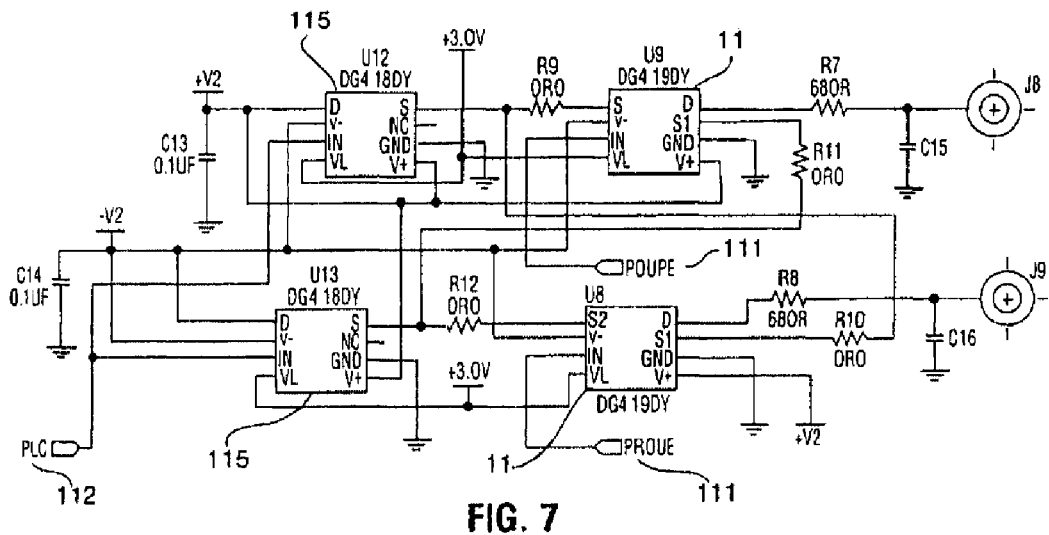

FIG. 7

UNITED STATES PATENT AND TRADEMARK OFFICE
CERTIFICATE OF CORRECTION

PATENT NO. : 6,837,182 B2
APPLICATION NO. : 10/194525
DATED : January 4, 2005
INVENTOR(S) : Hugo Leblanc Page 2 of 2

It is certified that error appears in the above-identified patent and that said Letters Patent is hereby corrected as shown below:

Application Should Read:

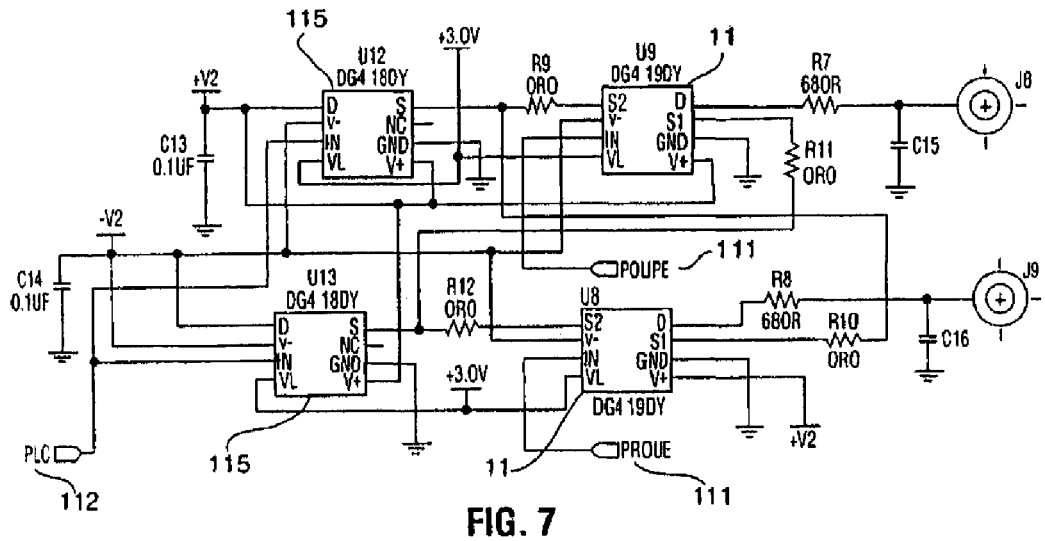

FIG. 7

Signed and Sealed this

Tenth Day of November, 2009

David J. Kappos
*Director of the United States Patent and Trademark Office*